United States Patent [19]
Phelps

[11] Patent Number: 6,068,034
[45] Date of Patent: May 30, 2000

[54] SYSTEM AND PROCESS FOR MATERIAL MANAGEMENT

[76] Inventor: Marvin M. Phelps, P.O. Box 550, Cottonwood, Ariz. 86326

[21] Appl. No.: 09/250,043

[22] Filed: Feb. 12, 1999

Related U.S. Application Data

[63] Continuation of application No. 08/878,894, Jun. 19, 1997.

[51] Int. Cl.[7] ...................................................... B27M 1/08
[52] U.S. Cl. .............................. 144/3.1; 144/4.2; 144/91; 144/347; 144/348; 144/350; 144/332; 144/364; 144/357; 144/367; 144/380; 144/382
[58] Field of Search ............................... 144/1.1, 3.1, 4.2, 144/90.1, 91, 91.2, 345, 347, 348, 350, 352, 356, 357, 367, 371, 364, 368, 380, 382, 392, 394, 402; 156/258, 304.5, 557; 52/693, 729.2, 739.1

[56] References Cited

U.S. PATENT DOCUMENTS

| | | |
|---|---|---|
| 3,262,723 | 7/1966 | Strickler . |
| 3,452,502 | 7/1969 | Price . |
| 3,692,340 | 9/1972 | Roth . |
| 3,702,050 | 11/1972 | Price . |
| 3,769,771 | 11/1973 | Shannon et al. . |
| 3,813,842 | 6/1974 | Troutner . |
| 3,927,705 | 12/1975 | Cromeens et al. . |
| 3,942,233 | 3/1976 | Cromeens . |
| 4,005,556 | 2/1977 | Tuomi . |
| 4,033,391 | 7/1977 | Troutner . |
| 4,082,129 | 4/1978 | Morelock . |
| 4,095,634 | 6/1978 | Berglund et al. . |
| 4,248,280 | 2/1981 | Taylor . |
| 4,800,938 | 1/1989 | Coombs . |
| 4,938,265 | 7/1990 | Mountz . |
| 4,941,521 | 7/1990 | Redekop et al. . |
| 5,090,462 | 2/1992 | Dimter . |
| 5,440,977 | 8/1995 | Poutamen . |
| 5,617,910 | 4/1997 | Hill . |

*Primary Examiner*—W. Donald Bray
*Attorney, Agent, or Firm*—Snell & Wilmer, L.L.P.

[57] ABSTRACT

An automated system and process for managing building materials which requires a minimal amount of manual labor and supervision. The automated system and method are especially suited for precutting lumber used for building trusses and frames having predetermined specifications.

12 Claims, 3 Drawing Sheets

SYSTEM AND PROCESS FOR MATERIAL MANAGEMENT

This application is a continuation of Ser. No. 08/878 894, filed Jun. 19, 1997.

FIELD OF THE INVENTION

The present invention generally relates to a system and process for managing the production of building materials which increases efficiency, eliminates excess waste, and reduces costs. More particularly, the present invention relates to a system and process for continuously producing lumber of various predetermined grades and lengths by cutting off a continuous line of lumber instead of handling several different lengths and grades of lumber to arrive at the lumber pieces having the predetermined grades and length. Futher, by cutting off of a continuous line of lumber, the present invention relating to a system and process for managing the production of lumber eliminates the trim end waste that is associated with handling and cutting several different lengths and grades of lumber to arrive at the required or ordered lumber pieces of predetermined lengths and grades.

BACKGROUND OF THE INVENTION

Methods and process for continuously finger jointing pieces of lumber end-to-end in order to create a continuous line of lumber which can be cut to desired lengths are well known in the prior art. For example, U.S. Pat. No. 3,927,705 issued to Cromeens et al. discloses methods and means for the continuous vertical finger jointing of lumber. In the Cromeens et al. patent reference, the ends of individual short timbers are conveyed transversely along their longitudinal axis in an abutting side-by-side on-edge relationship or in a solid sheet-like array throughout the finger shaping operations and application of adhesive to one end of each timber. The timbers are maintained in right angular relation to their longitudinal axis of travel and are then assembled end-to-end during linear conveyance to a final step where they are cut to desired lenght. Futher, another patent issued to Strickler, namely U.S. Pat. No. 3,262,723, describes a process for producing end jointed lumber wherein the continuous resulting lumber can be cut into desired lengths.

U.S. Pat. No. 3,769,771 issued to Shannon et al. discloses a structural truss having upper and lower wooden chords that are separated along their lengths by vertical wooden struts. A finger jointing machine is used to create continuous lengths of chords and a paper membrane having an adhesive backing is applied to the underside of the chords by a pressure roll. Precut strut members are inserted downwardly between the continuous lengths of chords, and on top of the adhesive backed membrane. A second adhesive backed membrane is applied to the upper faces of the chords and struts and the adhesive backed membranes which contain the loosely assembled truss frame are then cured thereby securing the membranes and truss frame elements together. The continuous one piece truss frame is then cut into predetermined lengths.

Another patent, U.S. Pat. No. 4,248,280 issued to Taylor, describes a method and machine structure for finger jointing lumber. More specifically, this patent reference discloses a continuous process for joining incoming random lengths of lumber to form a continuous outgoing length of lumber which can be cut into desired lengths. The process includes the steps of i) clamping the ends of two pieces of lumber at a predetermined distance apart from one another, ii) trimming the end of the lumber pieces using a trim saw, iii) simultaneously preshaping the opposing board ends to form opposing and complimentary angled finger members using a single axis preshaper saw, iv) further shaping and forming the opposing angled finger members using a heated die to densify and lengthen the angled finger members, v) simultaneously applying adhesive material to the angled finger members, and vi) jamming the finger members of the opposing board ends in an interlocking relationship for a predetermined period of time.

Several other prior art patents, such as U.S. Pat. No. 3,942,233, U.S. Pat. No. 4,095,634, and U.S. Pat. No. 3,692,340, disclose methods and apparatus for finger jointing lumber. Still other prior art patents, e.g. U.S. Pat. No. 3,813,842, U.S. Pat. No. 3,702,050, U.S. Pat. No. 3,452,502 and U.S. Pat. No. 4,005,556, disclose methods and apparatus directed to wood truss structures, wood truss joints, and truss framed housing comprising preassembled frames.

Conventional wooden trusses comprise an assemblage of lumber members which form a rigid framework. Roof and floor trusses in the building industry comprise long upper and lower wooden chords that are separated by a combination of vertical and diagonal wooden struts that are joined to the chords by nails or metal truss connector plates. The wooden members which comprise the truss must be cut to predetermined lengths with their ends sometimes cut at predetermined angles depending upon the resulting location of the truss in the building structure. Accordingly, a process which efficiently and effectively cuts all of the wooden members required for any given structural truss would greatly reduce the cost and time involved in preparing a lumber order for that given truss, and at the same time eliminate unnecessary waste lumber material associated with processing the lumber for that truss.

Although the prior art patents disclose methods and apparatus for continuously finger jointing pieces of lumber end-to-end in order to create a continuous line of lumber which can be cut to desired lengths, none of the prior art patents addresses the material handling problems associated with cutting and preparing the different wooden members required for a given truss structure. For example, although different lengths of a given width and grade of lumber may be cut from a continuous line of lumber of that same width and grade, a completely different grade and width may be required for another wooden member within a given truss. This would require the handling and processing of a different grade and width of lumber. To date, no one has conceived of a method or process for streamlining the cutting and processing of the wooden members required for building a given truss which eliminates the need for handling several different lengths of varying grades of lumber. Accordingly, there is a need for a method or process for managing the cutting and shaping of wooden members which comprise a given truss which reduces the manpower and increases the efficiency of the equipment needed for the process by eliminating the need for handling several different lengths of lumber of varying grades, which eliminates waste by eliminating the majority of the lumber which comprises the trim ends associated with trimming the varying lengths of lumber, and which increases production efficiency by enabling the equipment involved in the material management process to operate without significant downtime or waiting time.

The system and process for material management of the present invention may also be used in conventional light frame construction of housing. In other words, the system and process for material management of the present invention may also be used to efficiently cut and shape all of the wooden members or elements required for a preassembled rigid framework such as a floor truss, a roof truss, or a wall truss, or a preassembled rigid framework which combines floor, wall and roof truss components into a rigid structure for light construction.

SUMMARY OF THE INVENTION

It is a principle object of the present invention to provide a system and process for the management of building materials in constructing preassembled rigid frameworks such as trusses.

It is another object of the present invention to provide a system and process for managing building materials which results in better and more efficient use of manpower and processing equipment.

It is still another object of the present invention to provide a system and process for the managing building materials which reduces or eliminates waste of the building materials that are being processed.

It is yet another object of the present invention to provide a system and process for managing building materials which drastically reduces the costs involved in managing the building materials to produce an end result.

Still another object of the present invention is to provide a system and process for managing the cutting and shaping of wooden members that comprise a truss which reduces the manpower necessary for the process and increases the efficiency of the equipment necessary for the process.

Yet another object of the present invention is to provide a system and method for managing the cutting and shaping of wooden members that comprise a truss which is more efficient and cost effective over the existing conventional method for the same process by eliminating the need for handling several different lengths of lumber having several different grades for each length.

It is still another object of the present invention to provide a system and method for efficiently and effectively managing the cutting and shaping of wooden building members which includes means for treating the wooden building members with a fire retardant.

The present invention is directed to a system and method for managing building materials which streamlines the cutting and shaping of wooden members having predetermined lengths, grades, and angled edges. The system and process involves the utilization of any length of board which is finger jointed to form a continuous line of lumber. The continuous line of lumber is then cut and shaped according to preprogrammed information regarding the required length and grade of the desired wooden members as well as the required shape of the edges of the wooden members. The entire system and process is computerized to enable the steps which comprise the system and process to be in communication with one another.

The material management process of the present invention starts with the step of stocking lumber, all of equal length, by grade. The model system of the present invention may have several positions or chutes from which to begin the operation of carrying out the process of the present invention. For example, each of the chutes may be stocked with a specific width and grade of specific length wooden boards. The chutes separate the wooden boards by grade and width and it is anticipated that the length of the boards will all be the same. An operator stands at the chute area and feeds the needed grade of lumber onto a conveyor belt one board at a time. The board proceeds down the conveyor and passes through a moisture detector and a metal detector. Any board that does not pass the required specifications for moisture level and metal content is ejected off of the continuous conveyor line. If the board requires trimming for one reason or another, such as to trim a bad spot at the end of a board, the board is side ejected to a trim area. Once trimmed, the board is returned to the continuous conveyor line in linear arrangement with the other boards. The boards are then side transferred to enable them to be grooved on each of their ends for the finger joint process. After the ends of the boards are cut to form grooves, glue or some other type of adhesive is applied to one end joint on each of the boards. The boards are then side transferred back onto a continuous conveyor line which moves the boards in a linear relation to one another. The boards are then sent into a crowder which tightly shoves the ends of the boards together. The finger jointed lumber continues from the crowder into a radio frequency (RF) tunnel to allow for the drying and setting of the glue. When the lumber exits the RF tunnel, it proceeds to a proof loader which tests the reliability of the joint for strength purposes. The continuous piece of lumber is then cut to desired lengths indicated on a previously determined list. If no more cutting is required, the boards continue travel linearly on a conveyor to be packaged.

If additional cutting is required on the boards which have now been cut to a predetermined length, the boards are side transferred and accumulate in this transfer area for undergoing the next step of the process. The boards are then transferred again and run through another saw and cut, if necessary. Whether cut again or not, the boards then continue into a hopper where they are side transferred into a component saw to cut the required final lengths and angles on the boards. Once off the component saw, the lumber is stacked long to short, banded, and side transferred once again so that the banded package of lumber is transferred out of the building for staging and use.

In brief, the system of the present invention for managing building materials comprises:

means for loading a plurality of boards onto a continuous conveyor system;

means positioned along the continuous conveyor system for fingerjointing the ends of the boards to form a continuous piece of lumber;

means positioned along the continuous conveyor system for cutting the continuous piece of lumber into boards having predetermined lengths; and means positioned along the continuous conveyor system to cut the ends of the boards to their required angles.

Further, the automated method of the present invention for managing building materials, especially in pre-cutting lumber used for building trusses and frames having predetermined specifications comprises the steps of:

preprogramming a computer system to run an automated production line for lumber;

entering required lumber specification data for end products into the computer system;

loading a plurality of boards onto a continuous conveyor belt system;

fingerjointing the ends of the boards together to form one continuous piece of lumber while the boards travel along the continuous conveyor belt system;

cutting the continuous piece of lumber into boards having predetermined lengths based on the required lumber specification data while the boards are positioned on the continuous conveyor belt system;

cutting the ends of the boards to predetermined angles based on the required lumber specification data while the boards are positioned on the continuous conveyor belt system; and stacking, banding and transferring the cut boards to a defined location while the cut boards are positioned on the continuous conveyor belt system.

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings wherein like numerals denote like elements.

DETAILED DESCRIPTION OF THE PREFERRED EMBODIMENT

Figure 1:
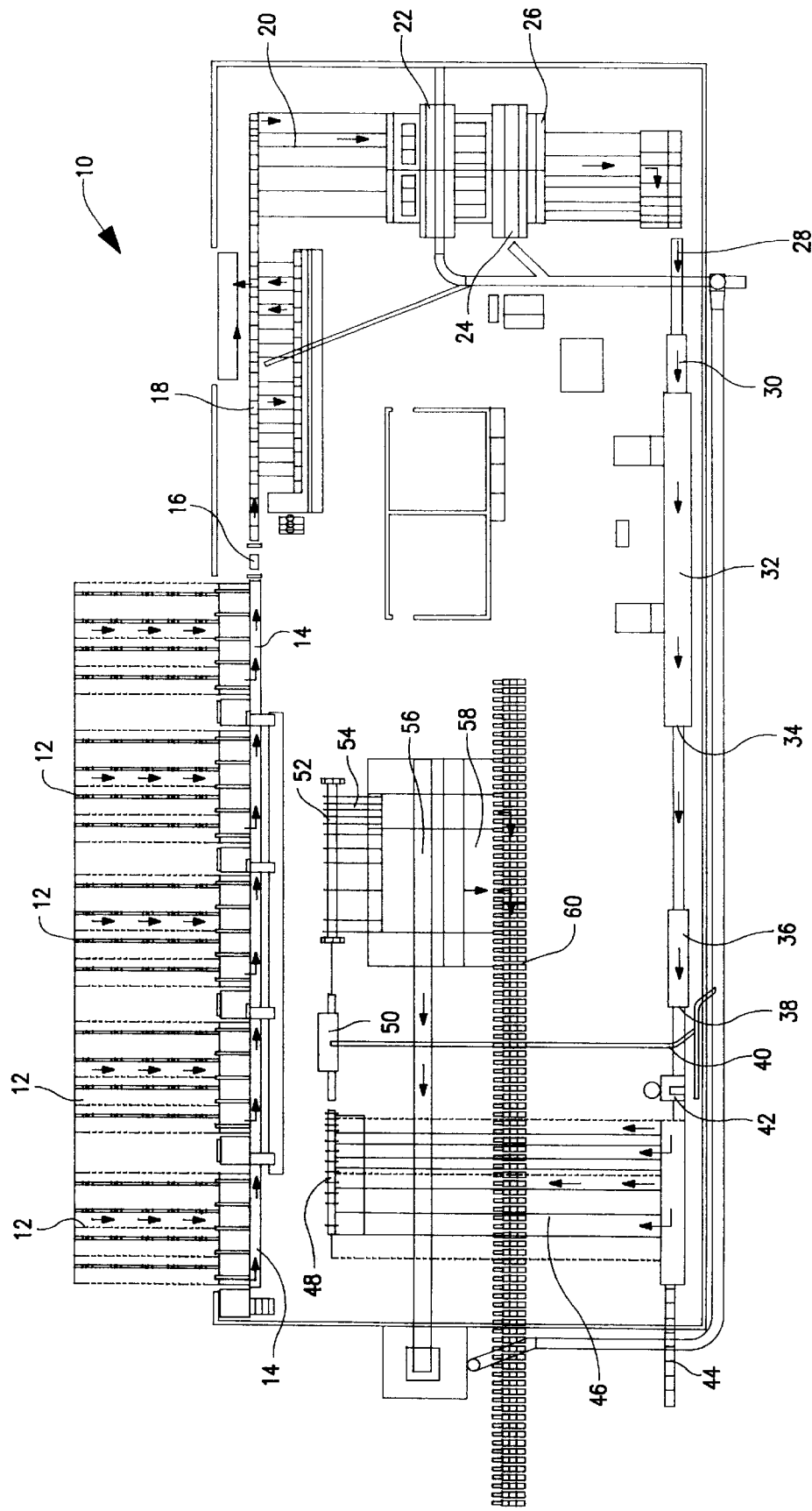
FIG. 1 is a reduced schematic of a preferred embodiment of the material management system of the present invention constructed in accordance with the present invention for carrying out the material management process.

A schematic of the material management system 10 of the present invention is shown in FIG. 1. The material management system 10 of the present invention is designed to manage and process the cutting and shaping of wooden members which make up a prearranged rigid framework such as a structural truss without the need to handle several different lengths of lumber. The material management system 10 of the present invention is designed to handle lumber only by grade and width in order to reduce costs and increase efficiency of the system over that of the conventional system for cutting and shaping wooden members for the building of trusses and other building structures. Once the required length of board for starting the process is eliminated, lumber can be stored in bulk by grade and width because there is no longer a need to have access to the varying lengths of lumber. As a result, the lumber does not have to be spread out according to length and lumber yard storage room is eliminated. Eliminating the need for required lengths of lumber to start the process also enables one to purchase the required grade and width of lumber in one length, preferably the cheapest.

The material management system 10 begins with the formation of stalls or chutes which may be stocked with designated grades and widths of lumber. For example, a material management system having five stalls or chutes may store the following lumber in those stalls or chutes: 2×4-#2, 2×4-1650, 2×4-2100, 2×6-#2, and 2×6-1650. The numbers designate width and grade of lumber. The number of stalls or chutes does not change the process. A manual operator is stationed at the stalls or chutes 12. The manual operator visually checks the quality of the boards and feeds them onto a continuous conveyor line 14 one at a time in linear relationship to one another. If a board is identified as visually defective, the operator rejects the board and does not feed it onto the continuous conveyor line 14. If the board is not defective but needs trimming to eliminate a bad spot, for example on the end of the board, the operator marks the board as a board which needs to be trimmed.

The boards continue down the continuous conveyor line 14 to an automatic sensor 16 which checks the moisture content of the board and detects the presence of any staples or foreign materials in the board. If the board does not meet the specifications for moisture content, or if the board contains foreign metal objects, the board is automatically ejected from the continuous conveyor line 14.

The boards that meet specifications continue down the conveyor line 14 and those boards that were marked for trimming are side ejected to a trim area 18. The side ejection to the trim area may be performed manually by a second operator or automatically by having a sensor which detects the demarcations that were made on those boards designated for trimming. A trim saw operator will then trim the bad spots on the board and then place the board back into continuous flow on the conveyor line 14 such that the boards are still in straight linear alignment with one another.

Next, the boards are side transferred by a side transfer conveyor 20 to a first saw which has mechanisms for squaring and for serrating or cutting finger joints. After the boards are side transferred, this first saw 22 squares one end of the boards and then grooves that same end. The boards then continue to be side transferred across the side transfer conveyor 20 to a second saw 24 having mechanisms for squaring and for serrating and cutting finger joints. The second saw 24 squares and grooves the opposite ends of the boards. A glue or other adhesive is then applied to one grooved end of each of the boards by unit 26. After applying glue or adhesive to the one grooved end of each of the boards, the boards are then side transferred over to a second linear conveyor line 28 such that they are once again in a linear end-to-end relationship with one another.

A crowder 30 is positioned along this linear conveyor line 28 and the boards traveling in an end-to-end arrangement along the linear conveyor line 28 are fed into the crowder 30. The crowder 30 tightly shoves the ends of the boards together so that the grooved ends of the boards are interengaged with one another to form finger joints. The system of the present invention for managing building materials is further distinguished over those systems in the prior art by its functional capability of aligning the boards such that they are continuously flush along one side during each of the processing steps carried out throughout the system. In conventional material processing systems, boards are typically aligned along their centerline so that any deviation in width from board to board is split to both sides. In contrast, the alignment of the boards in the present system such that they are flush with one another along one side of their lengths results in any arrearage in width to occur on the inside of the truss. The side of the boards which are flush is where the drywall is applied. In order to create this type of alignment in the present systems the infeed operator crowns all of the boards all one way. As a result, the crowned boards are toward the exterior of the truss and any arrearage in width is always toward the interior of the truss. Accordingly, one side edge of the continuous piece of lumber formed by finger jointing pieces of lumber is perfectly smooth and that smooth side will comprise the outside of the truss.

After leaving the crowder 30, the lumber travels through an enclosed RF tunnel 32 where heat is applied to the lumber. The heat functions as a catalyst to start the electrolysis reaction in the glue which causes the glue to set. The continuous piece of lumber then exits the RF tunnel at the far end 34 of the RF tunnel and then enters a double bending proof loader 36 to test the reliability of the strength of the joints. In the proof loader, the continuous piece of lumber is run between rollers where the pressure of the rollers can be adjusted based on the grade of lumber. If a joint is bad, it may break. Alternatively, if a joint doesn't meet the strength requirement for its particular grade, the joint is identified by marking it with a spray paint. This process step is carried out automatically. If a joint breaks or is identified as inferior, a trim saw 38 trims that end straight and a computer signal which is generated by the use of the trim saw is sent to the infeed operator that lie is going to be short a board. The infeed operator the makes up for the missing board by infeeding another board.

Once the continuous lumber piece exits the proof loader 36, it enters an optional treatment area 40 which contains a unit that is capable of spraying the lumber with a fire retardant. The treatment area 40 will be incorporated such that the unit may be shut on or off with the flip of a switch depending upon the lumber or specific job being processed. If the unit is switched off, the continuous lumber simply passes through the treatment area 40 without any application of the fire retardant.

The continuous piece of lumber then proceeds to a flying saw 42 which cuts the boards to their exact predetermined lengths. This saw may also cut the boards to their exact lengths while angling the ends of the boards at a predetermined angle. Nevertheless, the preferred function of the flying saw is to cut the continuous piece of lumber into boards having predetermined lengths and squared off edges. The boards requiring square cut ends, which do not require further angle cuts are ejected after being cut to their predetermined lengths and travel linearly along a third continuous conveyor line 44 to the outside of the building or room which contains the system equipment where the system is carried out. These boards can then be stacked outside the building. The flying saw 42 functions by grabbing the continuous piece of lumber, cutting the lumber while traveling with the lumber, releasing the lumber, and then returning and grabbing the lumber again. Tile flying saw can be programmed to cut specific lengths of lumber at predetermined angles leaving the predetermined lengths of boards having either square cut or angle cut ends.

Boards which require further processing in the way of shorter lengths or additional angles are then side transferred on a second side transfer conveyor 46. This second side transfer conveyor 46 functions as a staging area for housing lumber so that the remaining saws do not run out of lumber to cut while the flying saw 42 stops to adjust and change length and angle measurements. The boards are then transferred once again in linear arrangement to a fourth continuous conveyor line 48. The boards then travel linearly in an end-to-end configuration to another saw, namely a cutting-in-two saw 50. Here, if needed, the boards are cut in half to arrive at shorter length boards that would have slowed the process substantially if their predetermined lengths would have been cut using the flying saw 42. If this optional length cutting step is not needed, the boards simply pass by the cutting-in-two saw 50 and are transferred linearly into a hopper 52. The boards are then side transferred along a third side transfer conveyor 54 which functions as a buffer for a component saw 56.

The boards are then kicked up on their edges and the component saw 56 makes the required angle cuts on the boards. Again, like all of the previously described saws, this component saw is programmed by a computer to make the required angle cuts.

The cut boards then proceed to a stacker 58 which stacks the boards flat and bands them together. The banded stacks are then side transferred in a linear arrangement onto a fifth continuous conveyor line 60 which carries the banded stacks to a staging area outside the building.

A continuous exhaust system is connected to all of the saws to collect and remove the sawdust which is created during the cutting steps of the process. The entire system is managed by one or more computers which communicate with one another during the course of the process steps which comprise the system in order to keep the system running effectively and efficiently without a lot of downtime. The process starts by entering a cut list into one of the computers which computes the total lineal footage that will be required for that batch of cut lumber. The infeed operator then enters the length of boards that are currently available or being used for processing. The computer then computes the number of boards of that length that should be fed into the system. The computer counts the input of the number of boards all the way down to the last one and then indicates the number of boards of a given length having a different grade that should be entered into the system next. In carrying out the system and process of the present invention, the lower grades are fed first with followed by increasing grades until the highest grade is used. The infeed operator then starts feeding boards all over again starting with the lowest grade. Starting out with the lowest grade ensures that the same grade or a higher grade will be used to produce the next board in the event of a shortage. In other words, the system is always feeding a higher grade board over the grade of board that is being cut.

Figure 2:
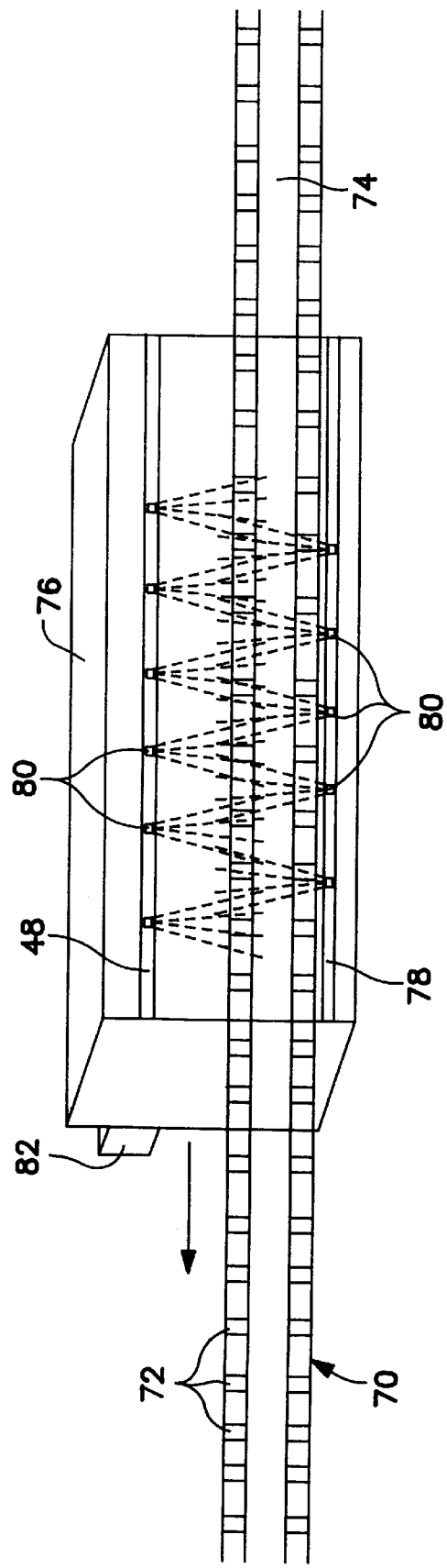
FIG. 2 is a schematic showing the optional system component of the material management system of the present invention comprising means for treating the building material with a fire retardant.

Turning now to FIG. 2, a schematic showing the optional system component of the material management system of the present invention comprising means for treating the building material with a fire retardant is illustrated. A linear conveyor belt 70 having rollers 72 is used to feed the continuous board 74 that has been joined together by finger jointing individual boards. The continuous board 74 is fed, via the linear conveyor belt 70, into a treatment housing 76 which includes upper and lower fluid lines 78 having apertures 80 for releasing and spraying a fire retardant or other chemical composition onto the continuous board 74. The treatment housing 76 also comprises a control box 82 having switches which control the automatic or manual functioning of the sprayers contained in the treatment housing.

This above described means for treating the lumber with a fire retardant comprises an optional step in the system and process for managing building materials of the present invention. When the step of treating the lumber with a fire retardant is not desired, the process for this step can be eliminated by shutting down the spraying mechanism within the treatment housing 76 at the control box 82. With the spraying mechanism disabled, the continuous board 74 simply passes through the treatment housing 76 unaffected.

Figure 3:
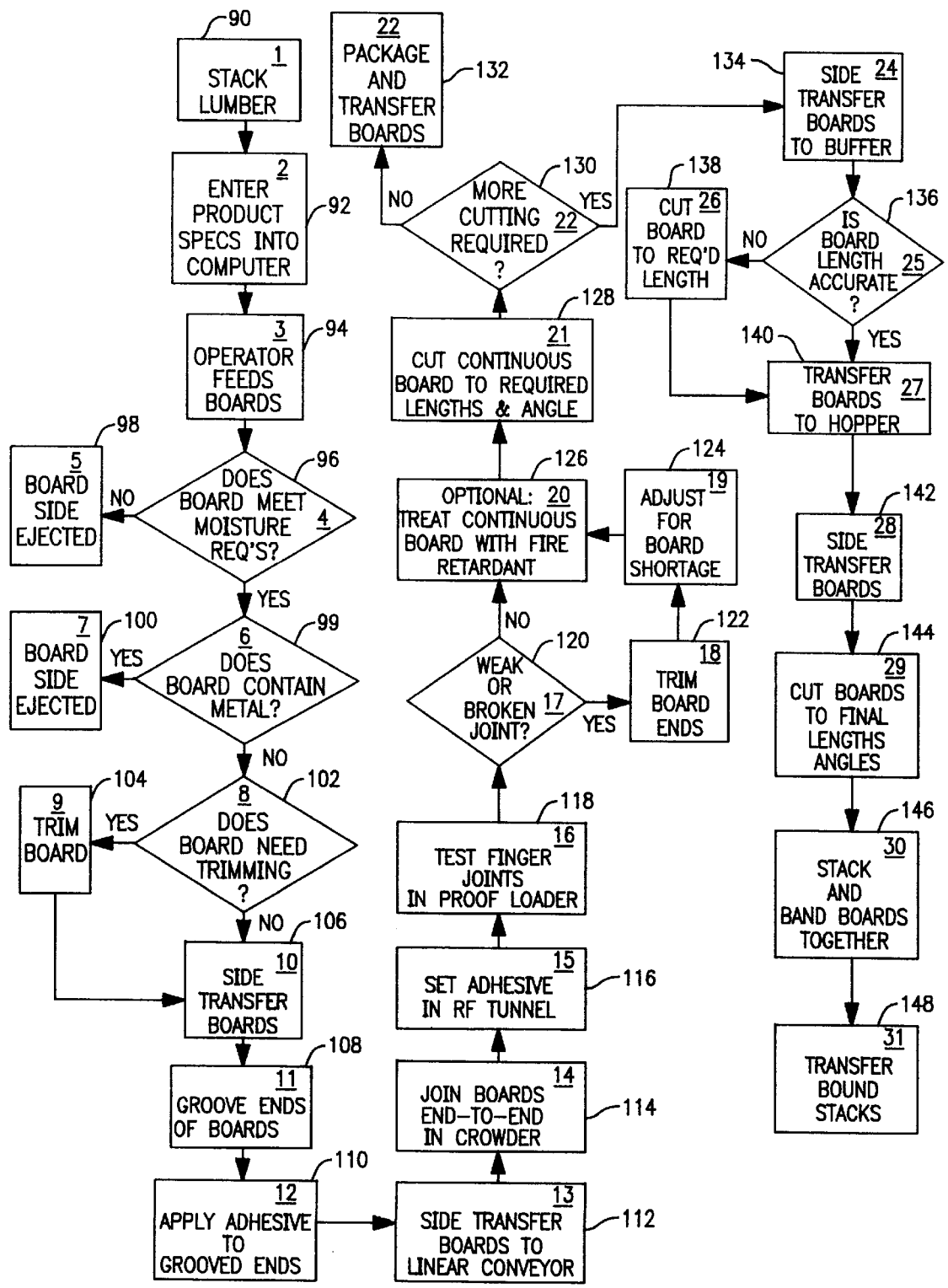
FIG. 3 is a flowchart illustrating the material management process of the present invention.

A flowchart illustrating the material management process of the present invention is shown in FIG. 3. In step one 90, lumber is stacked by width and grade. In that the material management process of the present invention is designed to accommodate any length of board, the boards to not have to be separated and organized by length. Product specifications regarding the required lengths and angles of the boards, as well as the total linear footage required for boards which will comprise a given truss or number of given trusses, are entered into a computer system in step two 92. The computer system controls the functioning of all of the machinery that is utilized throughout the process for managing building materials of the present invention. Once the specifications are entered into the computer, an operator feeds the required number of boards having a given width and grade onto a linear conveyor belt in step three 94. As the operator feeds the boards onto the conveyor belt, he performs a visual check of the boards and marks any boards that appear to have spots needing trimming.

Next, the boards travel along the linear conveyor belt until they reach a detector which determines the moisture content and the metal content of the boards. A further determination is made in step four 96 as to whether each of the boards meets the moisture requirement for the boards. If the moisture requirement for the board is not met, the board is rejected and side ejected off of the linear conveyor belt and out of the system in step five 98. Alternatively, if the moisture content of the board does meet the requirements, another determination is made in step six 99 to determine whether the board contains staples, nails or other metal objects. If the board contains metal objects, the board is rejected and then side ejected off of the linear conveyor belt and out of the system in step seven 100. Alternatively, if the board does not contain an inordinate number of metal objects, the board continues along the linear conveyor belt to a second operator.

The second operator views the boards as they travel along the linear conveyor belt and determines whether the boards need trimming in step eight 102. The boards may have already been marked for trimming by the first operator in which case the second operator simply pulls the designated boards and trims out the bad spots on the board in step nine 104. Once the boards are trimmed, they are returned to the linear conveyor belt. If the boards do not require any trimming, they simply continue to move along the linear conveyor belt to a side transfer area. The boards are then side transferred in step ten 106 so that they are now traveling along a conveyor belt side by side instead of end-to-end as was the case with the linear conveyor belt.

Both ends of each of the boards are then cut with grooves in step eleven 108. This is done by first passing one end of the boards past a first saw which squares off the ends of the boards and then grooves them. The boards continue to travel side by side and the opposite ends of the boards are then passed along to a second saw which squares off and then grooves these opposite ends. An adhesive is then applied to only one of the grooved ends of each of the boards in step twelve 110. Next, the boards are side transferred once again in step thirteen 112 to a linear conveyor belt where the boards once again travel in an end-to-end relationship with another. The grooved ends of the boards are then joined together in a crowder in step fourteen 114. More specifically, as the boards travel along end-to-end with only one grooved end of any two given adjacent grooved ends having adhesive, the crowder shoves the adjacent grooved ends of the boards together to form one continuous board. This process of grooving the ends of boards and then joining them together with an adhesive to form a single board is identified as finger jointing in the field of art. Nevertheless, although the process of finger jointing is contained within the process of the present invention, the process of the present invention goes way beyond finger jointing lumber in that the present invention accomplishes a way to automatically process lumber that is required for building specific trusses or housing frames, with a minimal need for manual involvement. This can drastically increase efficiency and reduces costs in the building industry.

Next, the continuous board travels through an RF tunnel in step fifteen 116 in order to dry and set the adhesive contained in the finger joints. The strength of the finger joints contained in the continuous board are then tested in a proof loader in step sixteen 118. In step seventeen 120, a determination is made as to whether any of the finger joints have broken or are weak. If a finger joint has broken, or if it is weak, the ends of the boards around the finger joint are trimmed so that they are cut square in step eighteen 122. Then, in step nineteen 124, an adjustment is made for the board shortage which has occurred by cutting and trimming the board at a weak finger joint. When the saw for trimming around the bad finger joints is used, the computer system which controls the process of the present invention detects this and enters information to the feed operator located at the start of the process to feed in an extra board. Once the ends around the bad finger joints are trimmed, the lumber continues to move along the linear conveyor belt to an optional treatment area. If the finger joints are not weak or broken, the continuous board also continues to move along on the linear conveyor belt until it reaches the optional treatment area.

In step twenty 126, the lumber is optionally treated by spraying the lumber with a fire retardant. A main on and off control switch, which can also be automated as part of the computer system, allows this step of the process to be either included or completely discluded depending upon its need. The continuous board is then cut to the required lengths and angles, which are predetermined and have been entered into the computer system at the start of the process, in step twenty-one 128 with a flying saw. Subsequent to this cutting, a determination is made as to whether additional cutting of the boards is required in step twenty-two 130. If no additional cutting is required, the cut boards are packaged and transferred to a location outside the process in step twenty-three 132. These boards may be transferred entirely out of the building depending upon their intended use.

The boards which require more cutting are then side transferred to a buffer area in step twenty-four 134. Next, in step twenty-five 136, a determination is made as to whether the board length meets its required length. If the board length is not accurate, the board is cut to its required length in step twenty-six 138. This additional length cutting step is present in the system in order to accommodate the cutting of short length boards so that the system will not be required to slow significantly at step twenty-one 128 where the initial length cuts are made. All of the boards, whether cut or not, are then transferred to a hopper in step twenty-seven 140. The boards are then side transferred in step twenty-eight 142 to a component saw which cuts the boards to their required final lengths and angles in step twenty-nine 144.

Finally, the cut boards are stacked and banded together in step thirty 146 and the bound stacks are transferred to a desired destination in step thirty-one 148. It should also be noted that the system and method of the present invention for managing building materials allows for short gaps between product runs whose specifications are entered by batch into the over computer system. As a result, the system will accommodate the processing of boards having a different width by allowing a predetermined time gap within the system between boards having different widths that are aligned along the continuous conveyor belt system to ensure that boards of varying widths are not fingerjointed to one another to form a continuous piece of lumber having significantly varying widths.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents fall within the scope of the invention.

I claim:

1. A system for managing building materials comprising:
   means for loading a plurality of boards each having first and second ends onto a continuous conveyor system;
   means positioned along said continuous conveyor system for fingerjointing the ends of the plurality of boards to form a continuous piece of lumber;
   means positioned along said continuous conveyor system for cutting said continuous piece of lumber into a plurality of boards of predetermined lengths having first and second ends; and
   means positioned along said continuous conveyor system to cut each of the ends of said plurality of boards having predetermined lengths at a predetermined angle.

2. The system of claim 1 wherein said entire system is automatically controlled by utilizing computer software and hardware.

3. The system of claim 1 further comprising means positioned along said continuous conveyor system for rejecting a board contained within said plurality of boards that are loaded onto said continuous conveyor system which does not meet a predetermined specification.

4. The system of claim 1 further comprising means positioned along said continuous conveyor system for strength testing the fingerjoints of said continuous piece of lumber.

5. The system of claim 1 further comprising means positioned along said continuous conveyor system for applying a fire retardant to said continuous piece of lumber.

6. The system of claim 1 further comprising means positioned along said continuous conveyor system for packaging those boards cut to predetermined lengths which do not require further end cutting and transferring said boards to a predetermined location.

7. The system of claim 1 further comprising a second means positioned along said continuous conveyor system for cutting said plurality of boards having predetermined lengths to yet shorter predetermined lengths.

8. The system of claim 1 further comprising means for creating buffer areas to store the plurality of boards at various points along said continuous conveyor system for managing building materials to ensure that the means for cutting contained within the system are cutting at full potential without significant wait times for obtaining said plurality of boards for further processing.

9. The system of claim 1 futher comprising means positioned along said continuous conveyor system for automatically stacking and banding those boards cut to predetermined lengths and angles.

10. The system of claim 9 further comprising means for transferring said stacked and banded boards to a predetermined location.

11. The system of claim 1 wherein said plurality of boards loaded onto said continuous conveyor system comprise any number of varying lengths.

12. The system of claim 1 further comprising means for transferring said plurality of boards having been cut to predetermined lengths to a predetermined location.

* * * * *